Feb. 13, 1962   F. C. DAVIDSON   3,020,778
BICYCLE GEAR SHIFT CONTROL
Filed Aug. 5, 1954
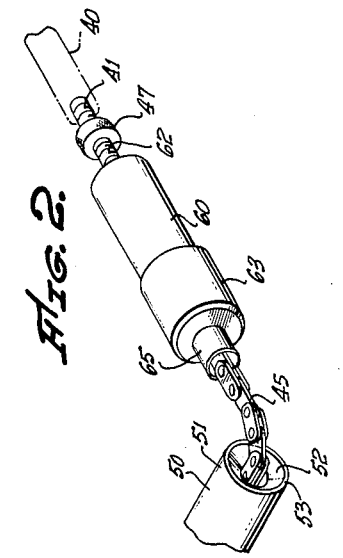
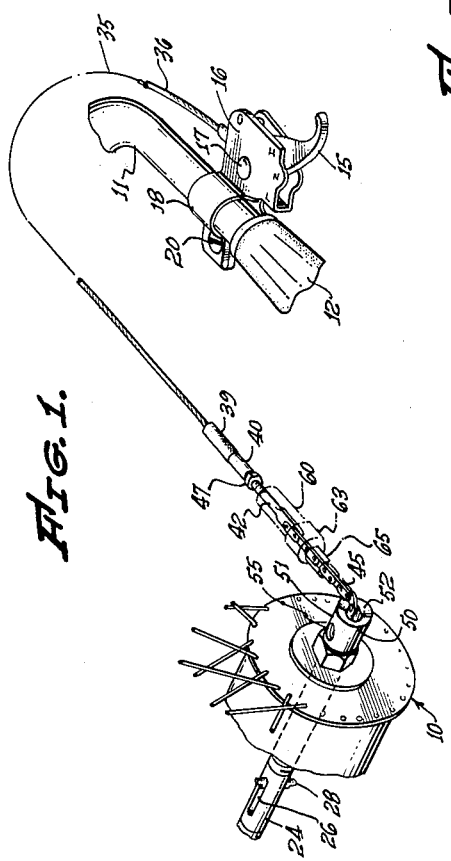
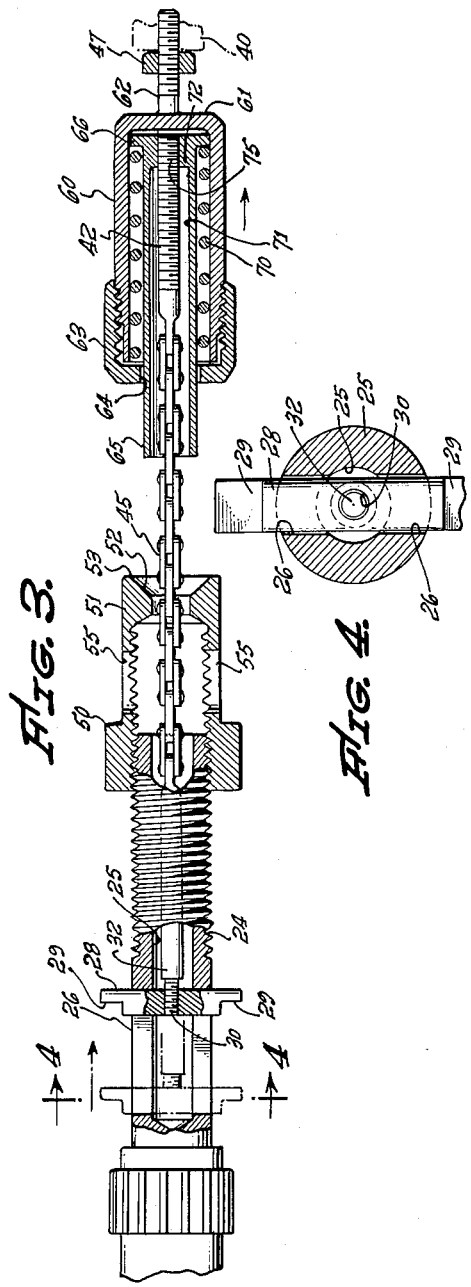
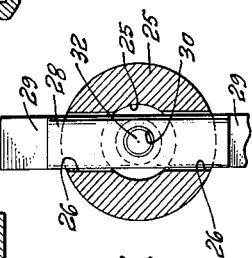
FRITHJOF C. DAVIDSON,
INVENTOR.
BY
Edward A Kendrick
ATTORNEY.

United States Patent Office 3,020,778
Patented Feb. 13, 1962

3,020,778
BICYCLE GEAR SHIFT CONTROL
Frithjof C. Davidson, Ridgecrest, Calif.
(2316 Vine St., Eau Claire, Wis.)
Filed Aug. 5, 1954, Ser. No. 448,109
2 Claims. (Cl. 74—489)

This invention relates to variable gear transmissions for bicycles and is directed to the problem of preventing frequent breakage in the control mechanism of such a transmission.

The conventional arrangement for selectively operating a 3-speed gear in the hub of the rear wheel of a bicycle includes the following elements: a gear shift control member on the handlebar of the bicycle in the form of a finger piece pivotally mounted in a suitable bracket; a first flexible member in the form of a wire connected to the shift control member; a sheath that is connected to the bracket and encloses the wire; a sleeve that is mounted on the end of the sheath and is adapted for fixed mounting on the bicycle frame; a slide member in the sleeve connected to the end of the wire; a second flexible member in the form of a short operating chain that is connected to the slide member and changes direction by approximately 90 degrees to enter an axial bore in the rear axle; an axial operating pin that is positioned in the axial bore and is connected at its outer end to the operating chain; and a cross pin in the axle in operating engagement with the transmission mechanism, the inner end of the axial operating pin being threaded into the center of the cross pin transversely thereof for causing the cross pin to shift longitudinally of the axle.

There is a troublesome defect in this conventional control arrangement that too frequently results in structural failure at the connection between the axial operating pin in the axle and the cross pin that reciprocates longitudinally of the axle. In some instances the axial pin breaks off at its weakened threaded end; in other instances, the cross pin fractures where it is centrally weakened by the transverse threaded bore that receives the end of the axial operating pin.

At first though it would seem that the answer to the problem would be in strengthening the structure where these failures occur. This answer is not favored for a number of reasons. In the first place, small dimensions must be maintained in the vulnerable part of the structure to meet the space limitations involved. In the second place, any redesigning of the variable speed transmission and the associated hub structure that would completely solve the problem would unduly increase the cost of the transmission. In the third place, changing the design of the transmission and the associated hub to strengthen the vulnerable parts of the structure would not solve the problem in an economical manner in bicycles now in use.

The present invention is based on the discovery that the cross pin and axial pin are adequate in strength to meet operating stresses of normal magnitude and fail only when excessive stresses are created under certain circumstances. One of these circumstances occurs when the rear wheel of the bicycle is stationary, because at such time the gear-shift mechanism in the hub will not respond readily to permit the cross pin to shift longitudinally of the axle. With the cross pin prevented from making responsive movement, both the cross pin and the axial operating pin connected thereto are stressed excessively by operation of the gear-shift control member on the handlebar.

The present invention solves the underlying defect by inserting a yielding connector in the train of connections between the shift control on the handlebar and the cross pin in the rear axle. The yielding connector includes a spring that affords sufficient resistance to transmit forces of operating magnitude to the cross pin but yields to prevent the transmission of excessive operating forces. The spring provides a certain delayed action. Thus operation of the shift control on the handlebar while the cross pin is prevented from responding results in the creation of a spring force that is insufficient to cause structural failure but is sufficient to move the cross pin subsequently when the cross pin is free to respond.

A special feature of the preferred practice of the invention is that the yielding connector is embodied in a simple and inexpensive unit that may be incorporated in existing transmission control arrangements. A further feature of the invention in this regard is that the unit may be installed rapidly and easily without requiring either special tools or specialized skill.

A conventional geared shift control is shown in French Patent 372,921. In general the objects of the invention are accomplished by providing yielding means connected serially with a first and second flexible means employed to shift the gear in the transmission. This yielding means preferably comprises first and second members having an interconnecting spring disposed therebetween with a force constant sufficiently large to prevent any substantial compression thereof for operation of the gear shift control but having a force constant insufficient to transmit forces from one of the flexible or cable members or handle bar gear shift control to the transmission itself when a force is imparted thereto that would ordinarily break elements in the transmission. Thus the combination is adapted for insertion in the train of elements that operatively connect the shaft control on the handle bar with a cross pin in the rear axle. In the preferred embodiment of the invention, the first member is threaded into the above-mentioned slide member to replace the usual longitudinal pin therein and the second member has a threaded bore to receive the replaced longitudinal pin.

As will be explained, a feature of the preferred embodiment of the yielding connector is that it increases by only a small amount the length of the train of elements that operatively connect the shift control on the handlebar with the axial pin in the rear hub axle.

The various objects, features and advantages of the invention may be understood from the following detailed description considered with the accompanying drawing.

In the drawing, which is to be regarded as merely illustrative:

FIG. 1 is a fragmentary perspective view showing a shift control on the handlebar of a bicycle operatively connected with a 3-gear transmission in the hub of the rear wheel of the bicycle;

FIG. 2 is a perspective view on a larger scale of the preferred embodiment of the invention incorporated in the train of elements that operatively connect the shift lever with the transmission;

FIG. 3 is a longitudinal sectional view of the new connector and the associated structure in the rear axle; and FIG. 4 is a sectional view on a larger scale taken as indicated by the line 4—4 of FIG. 3.

FIG. 1 shows a bicycle transmission assembly including the hub assembly 10 of the rear wheel of a bicycle which assembly incorporates a conventional 3-gear transmission under the control of suitable means mounted on the handlebar 11 of the bicycle adjacent the right-hand handle 12. In the construction shown, the gear-shift control on the handlebar includes the usual finger piece lever 15 mounted in a sheet metal bracket 16. The bracket 16 is provided with a rivet 17 to pivot the finger piece 15 and is formed with a split sleeve 18 that may be tightened by a suitable screw 20 to grip the handlebar 11 in a fixed manner.

The hub assembly 10 includes the usual axle 24 which is formed with an axial bore 25 and a longitudinal diametrical slot 26. The usual cross pin 28 is mounted transversely in the slot 26 to reciprocate therein longitudinally of the axle and is recessed at each end as indicated at 29 for operative engagement with the associated transmission mechanism. The cross pin 28 has a central transverse threaded bore 30 into which is screwed the inner threaded end of an axial operating member or pin 32.

Normally the cross pin 28 is at the leftward position shown in solid lines in FIG. 3 with the finger piece 15 on the handlebar at the rightward position shown in FIG. 1 for operating the bicycle in high gear. When the finger piece 15 is rotated clockwise by finger pressure to a second limit position, the cross pin 28 is shifted in the axle slot 26 to the rightward position shown in broken lines in FIG. 3 for operating the bicycle in low gear.

The train of elements that operatively connect the finger piece 15 with the axial pin 32 includes what may be termed a first flexible means in the form of a wire 35 that is connected at one end to the finger piece. The wire 35 is enclosed in the usual flexible sheath 36 with the end of the sheath connected to the bracket 16 on the handlebar. The sheath carries at its other end a suitable sleeve 39 in which is mounted a slide member 40 that is conected to the second end of the wire 35.

The slide member 40 has a threaded axial bore 41 (FIG. 2) into which is normally screwed the threaded end of a longitudinal connecting pin 42. The second end of the longitudinal connecting pin 42 is connected to what may be termed a second flexible means in the form of the usual short operating chain 45 and this chain is connected, in turn, to the axial pin 32. A suitable lock nut 47 on the threaded portion of the longitudinal connecting pin 42 is normally jammed against the end of the sleeve 39 to immobilize the connecting pin against rotation relative to the sleeve.

Since the operating chain must act through a 90 degree change in direction, a suitable guide bushing 50 is threaded onto the outer end of the axle 24. As best shown in FIG. 3, the guide bushing 50 has an outer end portion 51 of reduced inside diameter that is formed with a conical entrance 52 having a rounded circumferential rim 53. The surfaces of the conical entrance and its rim are polished to minimize frictional resistance to movement of the operating chain 45. The guide bushing 50 has the usual pair of diametrically opposite peripheral apertures 55 to permit visual inspection of the interior thereof. It is apparent that the effective length of the train of connecting elements between the finger piece 15 and the cross pin 28 may be varied by screw threaded adjustment of the longitudinal connecting pin 42 relative to the associated slide member 40.

All of the structure described in detail to this point is conventional in a 3-gear transmission arrangement for a bicycle. As heretofore stated, this structure operates in a satisfactory manner but is vulnerable to structural failure in that excessive operating forces commonly cause either the axial pin 32 to break off where it is weakened by threading at its inner end or to cause the cross pin 29 to rupture where it is centrally weakened by the threaded bore 30 that receives the inner end of the axial pin.

The preferred embodiment of the present invention comprises a yielding means or connector unit that is shown in solid lines in FIGS. 2 and 3 and is adapted to be installed in the position shown in phantom in FIG. 1. The connector unit includes a first member 60 in the form of a hollow cylindrical body that is closed at one end by an end wall 61 and has a threaded member or stem 62 extending axially from the end wall. The opposite open end of the cylindrical body 60 is externally threaded to receive a suitable bushing 63 having an axial opening 64.

Slidingly mounted in the cylindrical body 60 and slidingly extending through the opening 64 in the bushing 63 is a second member 65 in the form of a plunger. The inner end of the plunger 65 is formed with an enlargement or radial flange 66 and a suitable coiled spring 70 is mounted in the cylindrical body 60 under compression between the flange 66 and the bushing 63. In the construction shown the plunger 65 is of hollow construction with an axial bore 71 substantially larger in cross section than the longitudinal connecting pin 42. The axial bore 71 terminates in an end wall 72 at the inner end of the plunger 65 and this end wall has a smaller axial bore 75 that is threaded to receive the threaded end of the longitudinal connecting pin 42.

It is a simple matter to install the described yielding unit in the conventional arrangement shown in FIG. 1. The first step is to unscrew the longitudinal connecting pin 42 from the slide member 40, the lock nut 47 being loosened to free the connecting pin for rotation. The next step is to transfer the lock nut 47 to the threaded stem 62 of the connector unit and to screw the threaded stem 62 into the slide member 40, the threaded stem thus replacing the connecting pin 42 in the slide member. The nut 47 is then jammed against the end of the slide member 40 at the selected position of the threaded stem 62. The next step is to insert the longitudinal connecting pin 42 into the hollow plunger 65 of the connector unit and to thread the longitudinal connecting pin into the smaller axial bore 75 at the inner end of the plunger. To carry out this last step either the longitudinal connecting pin 42 may be rotated relative to the plunger 65 with the plunger stationary, or the plunger may be rotated relative to the longitudinal connecting pin with the connecting pin stationary. A feature of the invention in this regard is the fact that the plunger 65 is rotatable in the cylindrical body 60.

The manner in which the invention serves its purpose will be readily understood from the foregoing description. Normally the spring 70 maintains the plunger 65 at its inner limit position shown in FIG. 3. The spring 70 is strong enough to transmit operating force adequate for changing gears but will yield whenever the operating force applied thereto exceeds a magnitude that might result in failure of either the axial operating pin 32 or the associated cross pin 28. Thus, under normal conditions, the spring 70 does not yield and the connector unit functions, in effect, as a solid part for transmitting operating force from the wire 35 to the chain 45. If, however, the cross pin 28 does not shift readily, for example, when the rear wheel of the bicycle is stationary, clockwise rotation of the finger piece 15 to its limit position merely results in relative movement between the hollow body 60 and the plunger 65 with resultant compression of the spring 70. If the rear wheel of the bicycle is now rotated to free the cross pin 28 for the desired shift, the compressed spring 70 will expand to provide the required operating force for carrying out the shift in gears.

My description herein of a selected embodiment of the invention, by way of example and to illustrate the principles involved, will suggest various changes, substitutions and other departures from my disclosure that properly lie within the spirit and scope of the appended claims.

I claim:

1. A yielding connector for use in the train of elements that operatively connects a gear shift control lever having a predetermined limit of travel on the handlebar of a bicycle with a variable speed transmission in the hub of the rear wheel of the bicycle, which train includes a slide member operatively connected to the lever by a first flexible means, a longitudinal connecting pin that is threaded into the slide member axially thereof, and a second flexible means connecting the longitudinal connecting pin with the variable speed transmission, said yielding connector comprising: a hollow body open at one end and having a threaded axial stem at the other end dimensioned to screw into said slide member for connection thereby with said first flexible means; a plunger slidingly mounted in said hollow body and having a threaded longitudinal bore to receive said longitudinal pin for connection thereby to said second flexible means; a coiled spring surrounding said plunger inside said hollow body in compression between the plunger and the body to urge said plunger toward said other end of the hollow body, said yielding means being substantially unyielding to forces normally required to operate said gear-shift control, but being substantially yielding to forces tending to cause the fracture of any component part of the transmission, said yielding means having a limit of travel greater than said predetermined limit of travel of said gear-shift control.

2. A yielding connector for use in the train of elements that operatively connect a gear-shift control lever having a predetermined limit of travel on the handlebar of a bicycle with a variable speed transmission in the hub of the rear wheel of the bicycle, which train includes a slide member operatively connected to the lever by a first flexible means, a longitudinal connecting pin that is threaded into the slide member axially thereof, and a second flexible means connecting the longitudinal connecting pin with the variable speed transmission, said yielding connector comprising: a hollow body open at one end and having a threaded axial stem at the other end dimensioned to screw into said slide member for connection thereby with said first flexible means; a plunger slidingly mounted in said hollow body and having a threaded longitudinal bore to receive said longitudinal pin for connection thereby to said second flexible means; a coiled spring surrounding said plunger inside said hollow body in compression between the plunger and the body to urge said plunger toward said other end of the hollow body, said yielding means being substantially unyielding to forces normally required to operate said gear-shift control, but being substantially yielding to forces tending to cause the fracture of any component part of the transmission, said yielding means having a limit of travel greater than said predetermined limit of travel of said gear-shift control, said plunger having an axial bore larger in diameter than said longitudinal connecting pin, said axial bore terminating at an end wall at the inner end of the plunger, said plunger end wall having a threaded bore for engagement by said longitudinal connecting pin, whereby at least a major portion of said longitudinal connecting pin may be coextensive with the plunger to minimize the distance separating the longitudinal connecting pin from said slide member when the yielding connector is installed.

References Cited in the file of this patent

UNITED STATES PATENTS

| | | |
|---|---|---|
| 226,534 | Maloney | Apr. 13, 1880 |
| 671,676 | Judson | Apr. 9, 1901 |
| 737,675 | Sturney | Sept. 1, 1903 |
| 863,422 | Newton | Aug. 13, 1907 |
| 1,149,901 | Ellett | Aug. 10, 1915 |
| 1,166,452 | Gardner | Jan. 4, 1916 |
| 1,454,392 | Loyd | May 8, 1923 |
| 2,090,246 | Alexander | Aug. 17, 1937 |
| 2,166,866 | Hansen | July 18, 1939 |
| 2,773,398 | Swain | Dec. 11, 1956 |

FOREIGN PATENTS

| | | |
|---|---|---|
| 27,620 of 1902 | Great Britain | Oct. 15, 1903 |
| 372,921 | France | Mar. 4, 1907 |